Patented June 7, 1932

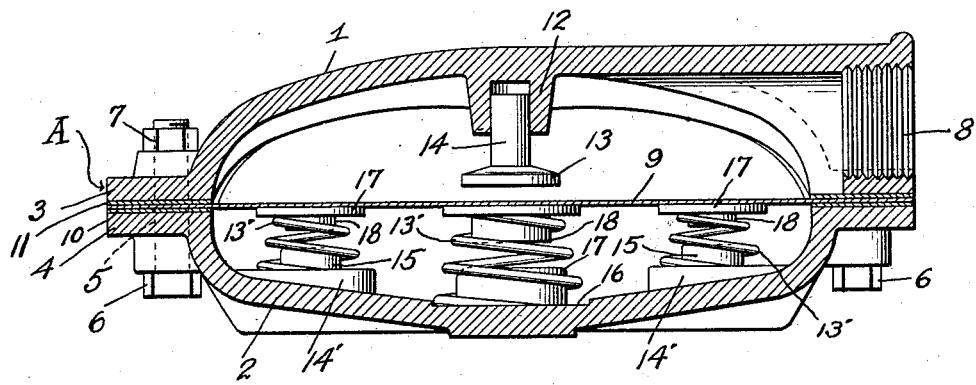
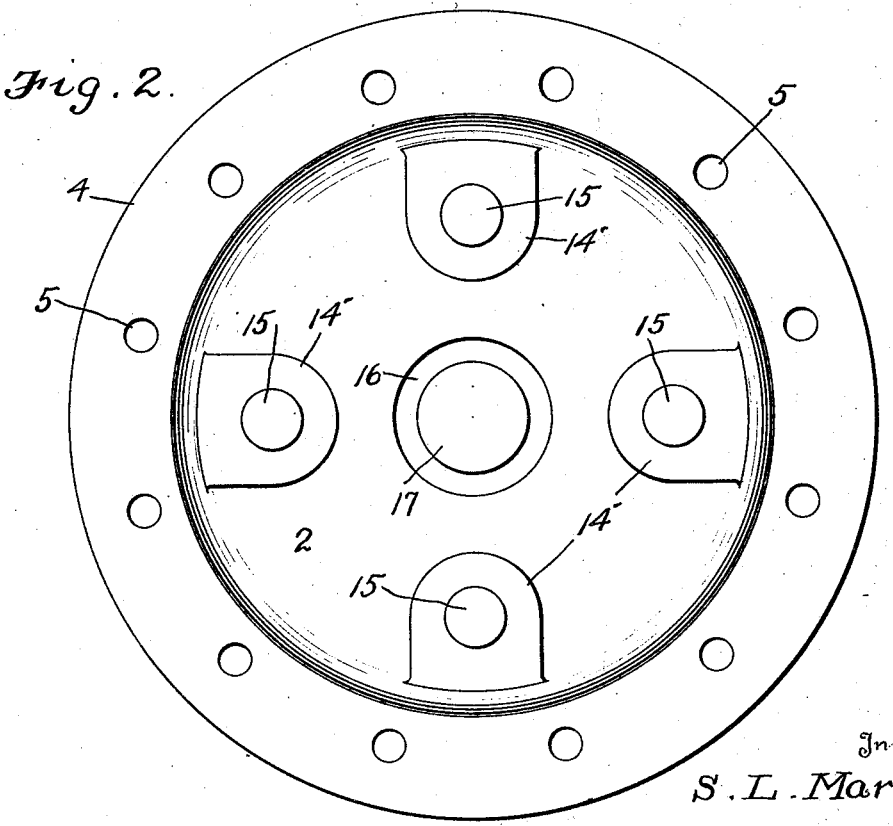

1,862,228

UNITED STATES PATENT OFFICE

SAMUEL L. MARSH, OF NEW YORK, N. Y.

HYDRAULIC SHOCK ABSORBER

Application filed May 11, 1929. Serial No. 362,249.

This invention relates to hydraulic shock absorbers and more particularly to that type of shock absorber which is designed to prevent or damp out vibrations in a column of fluid flowing through pipe systems which are frequently caused by quick shutting off of the flow of fluid through the systems.

I am aware that it has been contemplated in the past to use diaphragms, plungers and the like, which are adapted to be displaced by vibrations in the fluid columns so as to permit of the taking up of said vibrations. In all such devices, so far as I am aware, the taking up of the vibration is accomplished by means of displacement. The present device, however, operates on an entirely different theory in that the vibrations are taken up by means of a diaphragm which is designed and constructed of such material that it will vibrate rapidly in synchronism with the vibrations in the fluid column. In other words, the diaphragm acts as a tympan or drum against which the vibrations beat, thereby causing similar vibrations of the diaphragm which is composed of spring metal and is thus enabled to vibrate rapidly with the vibrations in the fluid column.

An object of the present invention is to provide a shock absorber in which a stop is secured in the casting to one side of the diaphragm for the purpose of limiting vibrations thereof so as to prevent the diaphragm from blowing out due to excessive pressure.

Another object of the present invention is to provide a plurality of springs on the opposite side of the diaphragm which are distributed equally over the entire area of the diaphragm and which tend to return the diaphragm to its normal plane, the spring pressure being so distributed as to prevent any warpage of the diaphragm and at the same time permit ready vibration thereof.

A still further object of the invention is to form cushioning elements from tapered or nested springs so that in the event of the compression of the diaphragm to such an extent that the coils of the springs would contact with each other if a true helical spring were employed, they will in the present instance telescope, thereby permitting complete flexing of the diaphragm without the possibility of the coiled springs acting to retard the same.

A still further object is to provide means on opposite sides of the diaphragm and against which the diaphragm contacts with broad bearing faces so that upon contact of the diaphragm therewith, there is no likelihood of puncturing the same.

Further objects and advantages will be more readily apparent as the description proceeds, when taken in conjunction with the accompanying sheet of drawing, and while I have illustrated the preferred embodiment of my invention herein, I desire it to be clearly understood that changes in minor details of construction, arrangement or finish of the parts, may be resorted to without departing from the spirit or scope of the claims hereunto appended.

In the drawing:—

Figure 1 is a longitudinal central sectional view of my invention.

Fig. 2 is a plan view of the lower half of the casing with the interior working parts removed.

Referring more particularly to the drawing, I have illustrated a casing, generally indicated at A. This casting comprises sections 1 and 2 which for the sake of clearness in description, will be referred to as the "water section" and "spring section", respectively.

Both of the sections 1 and 2 are provided with marginal flanges 3 and 4 which are provided with bolt holes 5 which are adapted to register and through which bolts 6 are passed and receive on the other end thereof the nuts 7, whereby the sections 1 and 2 may be clamped together.

The section 1 is provided with a screw threaded inlet 8 by means of which the casing A may be secured to a fluid piping system.

Clamped between the marginal flanges 3 and 4 is a diaphragm 9 which is composed of spring metal, preferably copper, due to the fact that the resistance of copper to rust is well known, but it is to be understood that any spring metal may be used so long as it possesses sufficient resiliency to accomplish the purpose of the present invention.

Interposed between the diaphragm 9 and the marginal flanges 3 and 4 are packing rings 10 and 11 so that when the sections 1 and 2 are clamped by means of the bolts 6, a water-tight joint therebetween is formed.

On the "water section" 1, I provide an integral socket 12 extending from the wall thereof at a point approximately the center of the diaphragm and in the socket 12, I place a button 13 provided with a reduced shank 14 which is forced into the socket 12 so as to be permanently and rigidly secured therein.

The material which I have found preferable for the button 13 and shank 14 is bakelite or a phenolic condensation product because of its resistance to rust and of its ready adaptability in molding the shank 14 and button 13 as an integral structure. However, I desire it to be understood that metal, wood or any other suitable substance, may be employed so long as it fulfills the necessary requirements and I desire it to be further understood that the button 13 does not necessarily have to assume the form as illustrated herein, it being sufficient that a rigid button or stop member be secured to the "water section" 1 and presents a relatively broad bearing face against which the diaphragm 9 contacts during its vibration.

The purpose of the stop, as illustrated by the button 13 is to prevent excessive warpage of the diaphragm 9 in the direction toward the side wall of the "water section" 1, it being understood that if no means is provided to limit vibration of the diaphragm, there is grave likelihood that the diaphragm will be blown out or torn when it is flexed beyond its elastic limits.

As heretofore stated, the diaphragm 9 is of spring metal and is, therefore inherently resilient so that it normally tends of itself to assume a plane in alignment with the meeting faces of the marginal flanges 10 and 11. However, because of long and constant use, there is a slight tendency for the diaphragm 9 to warp out of this plane and to insure the returning of the diaphragm to its normal plane, I provide a series of pressure members in the spring section 2 of the casing.

These pressure producing members comprise a plurality of springs 13' which are of tapered formation, as clearly illustrated in Fig. 1.

These tapered springs 13' are spaced at equidistant points throughout the area of the diaphragm so as to produce a uniform pressure on the spring side of the diaphragm to insure returning of the diaphragm throughout its entire area to its normal plane.

In the present case, I have illustrated four of such springs as can be seen from Fig. 2, together with a central spring, but it is to be understood that any number of such springs can be utilized so long as they are distributed equally within the "spring section" of the casing.

The springs 13' which are arranged adjacent the periphery of the diaphragm are mounted at their lower end on shelves 14' cast integrally with the casing 2, and on the shelf 14' are integral studs 15 about which the lower end of the coiled spring is encircled.

The central spring 13' is held in place by forming a socket 16 in the casing 2 into which the base of the central spring 13' is adapted to fit and a stud 17 is projected upwardly from the base 2 within the coils of the central spring 13'.

By means of the foregoing construction, it will be seen that any tendency of the springs to be displaced from their seats is counteracted by means of the studs 15 and 17 which project into the coils.

At the upper end of each of the springs 13', I provide buttons 17 having reduced shanks 18 which are adapted to fit within the uppermost coils of the tapered springs 13', and it is to be noted that the buttons 17 contact with the spring side of the diaphragm 9 and form relatively broad bearing faces which prevent any possibility of puncture of the diaphragm.

These buttons 17 are likewise preferably formed of bakelite or other phenolic condensation product, although it is to be understood that any suitable composition or material may be used for this purpose, and while I have illustrated a specific type of button, I desire it to be understood that any suitable structure may be employed such, for example, as a washer so long as it provides a requisite breadth to produce a relatively wide bearing face which engages the diaphragm 9.

From the foregoing, it will be seen that on the "water section", I provide means for limiting vibrations of the diaphragm in one direction, thereby eliminating any possibility of rupture or fracture due to excessive vibrations, and that on the "spring section" of the casing, I provide a plurality of springs equally distributed throughout the area of the diaphragm which insure returning of the diaphragm to its normal position, and while it is true that the springs 13' will serve in a slight degree to cushion the diaphragm 9, this is not intended as the primary function of the springs 13'. The function for which designed is to insure returning of the diaphragm to normal position because the diaphragm itself, being inherently resilient, will flex sufficiently to take up vibrations in the fluid column and will also of itself return to normal position, the springs 13' functioning merely in the event of slight warpage of the diaphragm 9 due to long and continuous use.

It is to be understood that the present invention is capable of application to any pipe systems such as water systems or oil well apparatus, or in any other system in which vibrations in the fluid column take place.

In the "water section" of the casing 1, I provide deflecting ribs 19 which radiate from the socket 12, as shown in Fig. 1. The purpose of these ribs is to break up the flow of fluid through the inlet 8 and deflect the same against the diaphragm, it being understood that due to the radiating location of the ribs 19, the vibrations will be deflected in constantly varying angles against the face of the diaphragm 9.

It will be seen, from the foregoing description that I have provided a very simple, inexpensive and durable device and that by this construction, the diaphragm 9 is protected from the possibility of rupture or fracture, that there are relatively few moving parts and consequently, when once installed, is capable of operation for an unlimited time without the necessity of renewal parts or repair.

What is claimed is:—

1. A device for preventing water hammer and the like, comprising a casing having an inlet, a spring metal diaphragm in said casing providing a fluid receiving chamber, and a stop on said casing against which the diaphragm contacts during vibration thereof.

2. A device for preventing water hammer and the like, comprising a casing having an inlet, a spring metal diaphragm in said casing providing a fluid receiving chamber, and a stop having a relatively broad bearing face against which the diaphragm contacts during vibration thereof.

3. A device for preventing water hammer and the like, comprising a casing having an inlet, a spring metal diaphragm in said casing providing a fluid receiving chamber, a socket on said casing, and a button provided with an enlarged head presenting a relatively broad bearing face against which the diaphragm contacts during vibration, and a shank fitting within the socket on said casing.

4. A device for preventing water hammer and the like, comprising a casing having an inlet, a diaphragm in said casing and providing a fluid receiving chamber, a stop on the casing on one side of said diaphragm normally spaced from the diaphragm and against which the diaphragm engages when vibrated, and a plurality of spring members coacting with the other side of said diaphragm at spaced points to maintain said diaphragm in its normal plane.

In testimony whereof, I have hereunto set my hand, this 9th day of May, 1929.

SAMUEL L. MARSH.